Figure 1:
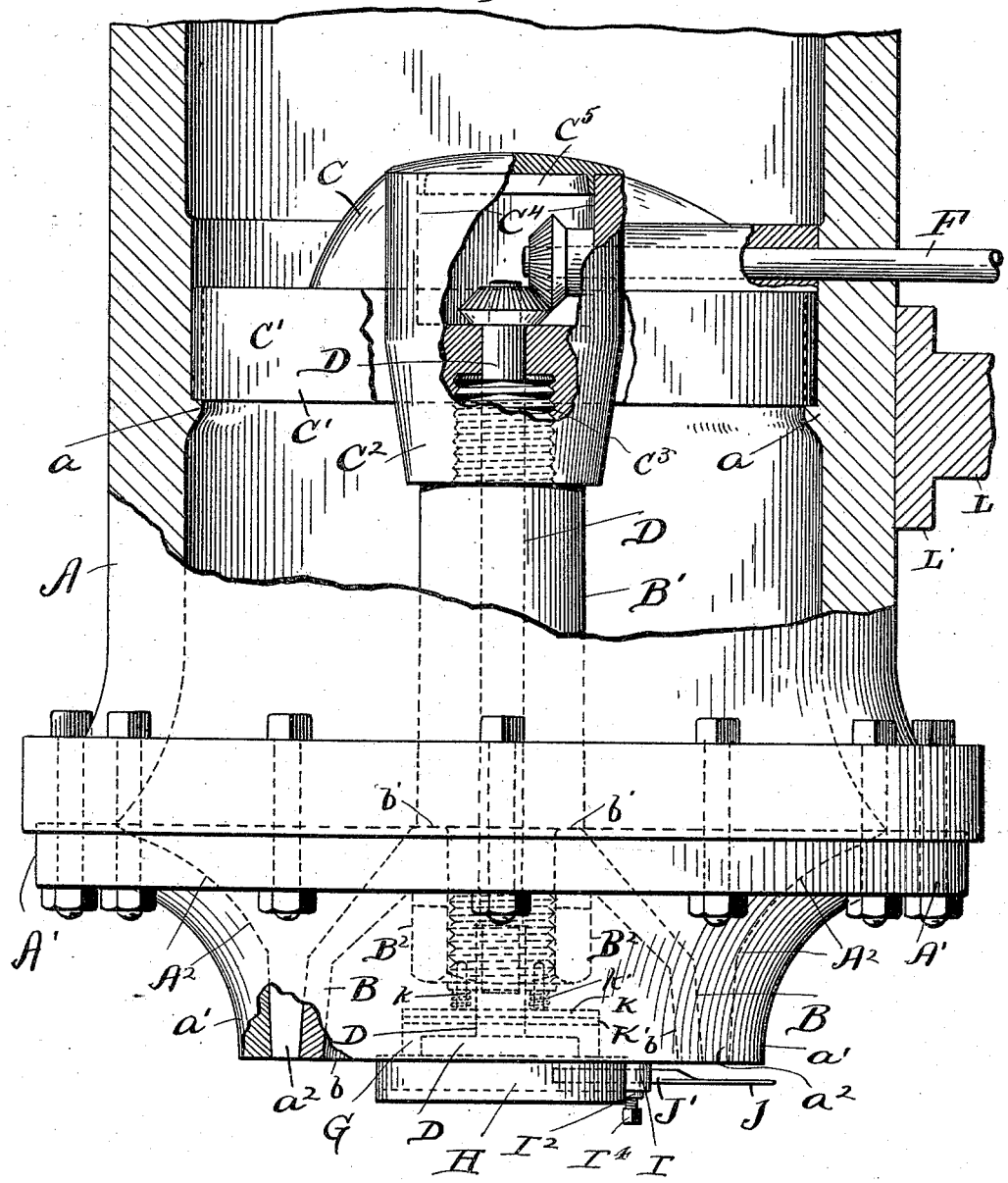

(No Model.) 4 Sheets—Sheet 1.

W. W. WALLACE.
CUT-OFF MECHANISM.

No. 526,274. Patented Sept. 18, 1894.

Witnesses.
E. Byron Gilchrist

Inventor.
William W. Wallace
By Leggett & Leggett
his Attorneys

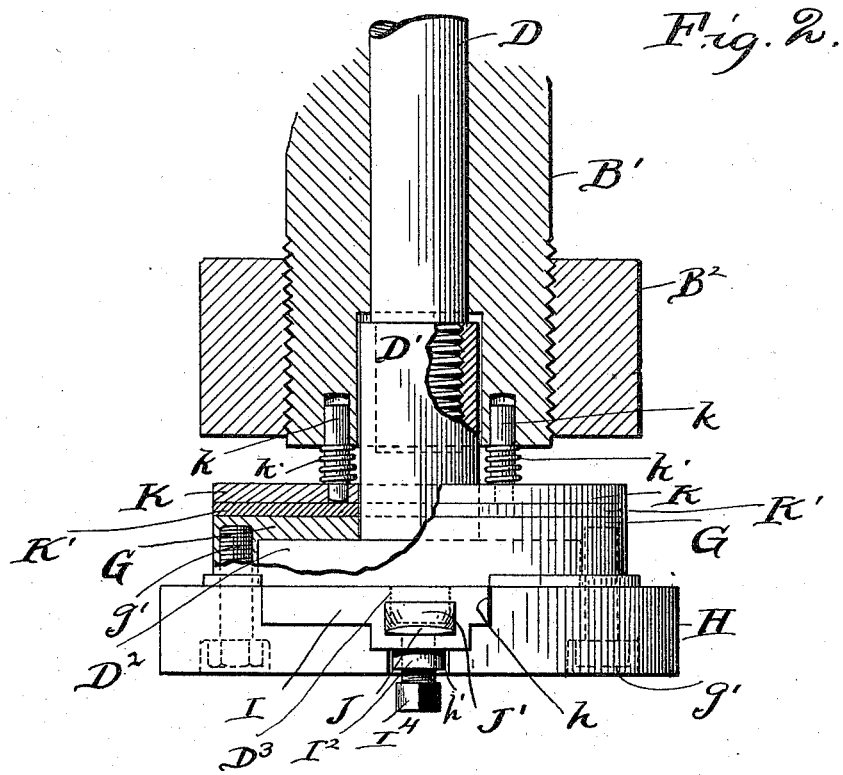
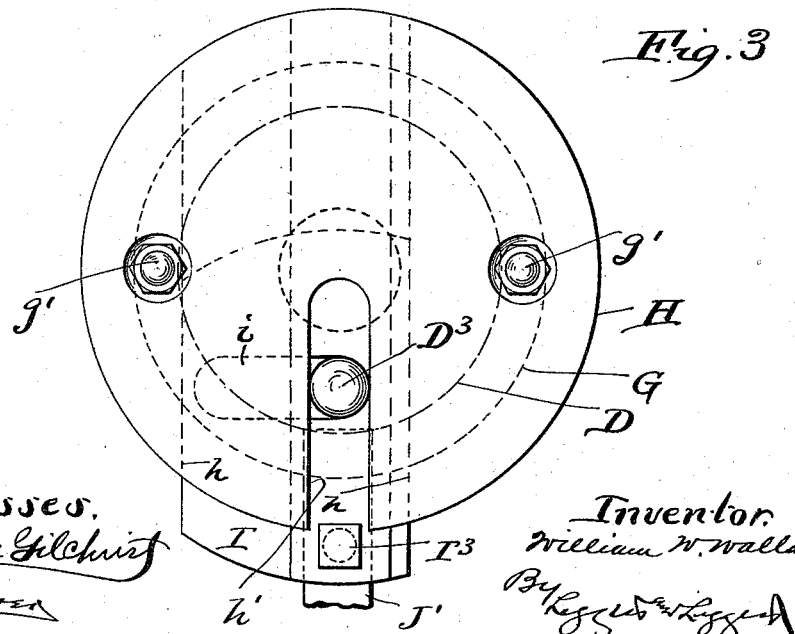

(No Model.) 4 Sheets—Sheet 3.
W. W. WALLACE.
CUT-OFF MECHANISM.
No. 526,274. Patented Sept. 18, 1894.
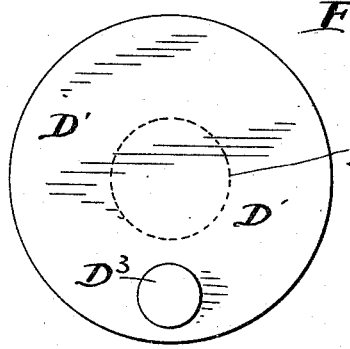
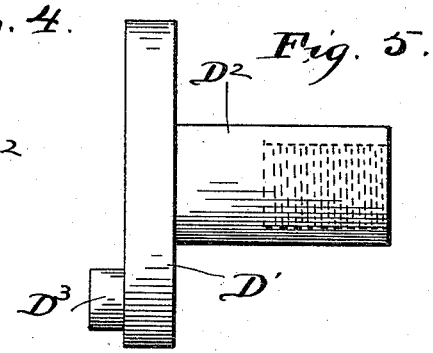
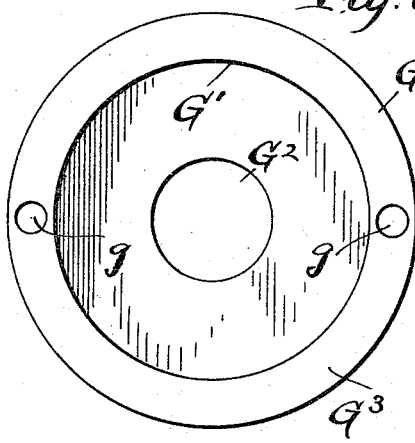
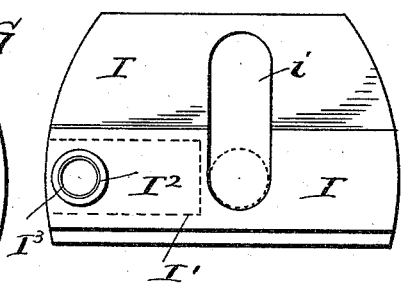
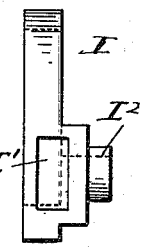
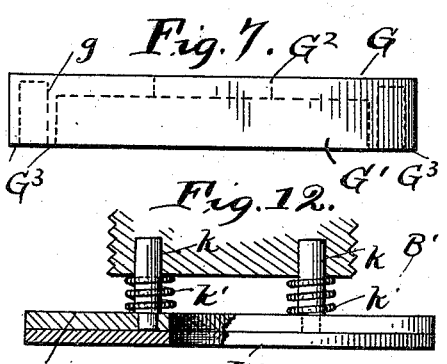
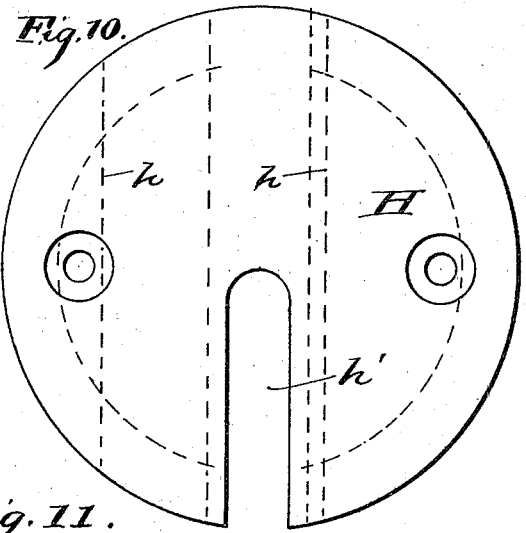
Witnesses:
E. Byron Gilchrist
Inventor:
William W. Wallace
By Leggett & Leggett
his Attorneys (No Model.)　　　　　　W. W. WALLACE.　　　　4 Sheets—Sheet 4.
CUT-OFF MECHANISM.
No. 526,274.　　　　　　　Patented Sept. 18, 1894.
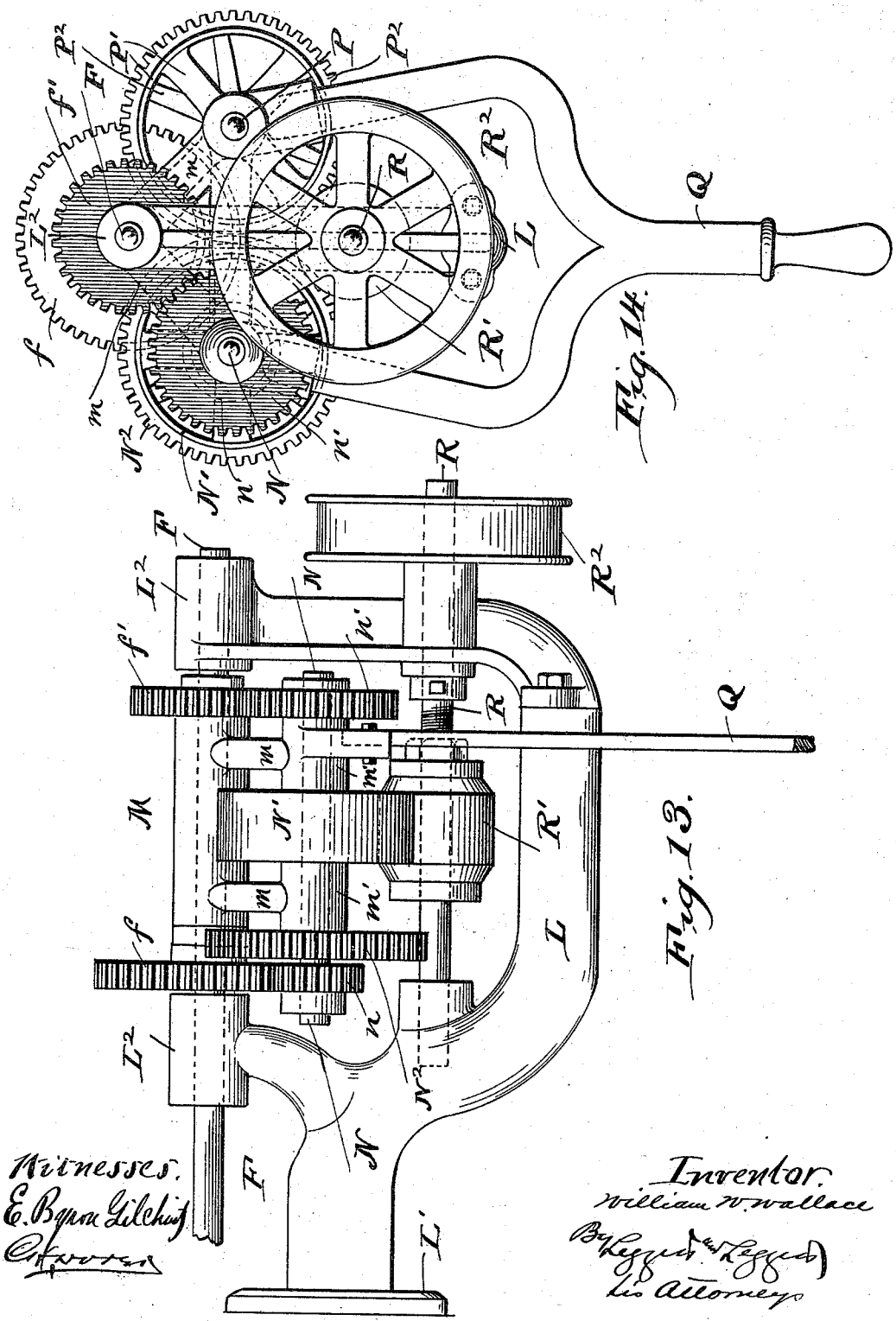

UNITED STATES PATENT OFFICE.

WILLIAM W. WALLACE, OF WILLOUGHBY, OHIO.

CUT-OFF MECHANISM.

SPECIFICATION forming part of Letters Patent No. 526,274, dated September 18, 1894.

Application filed November 7, 1893. Serial No. 490,240. (No model.)

*To all whom it may concern:*

Be it known that I, WILLIAM W. WALLACE, of Willoughby, in the county of Lake and State of Ohio, have invented certain new and useful Improvements in Cut-Off Mechanism; and I do hereby declare the following to be a full, clear, and exact description of the invention, such as will enable others skilled in the art to which it pertains to make and use the same.

My invention relates to improvements in cut-off mechanism designed for presses for making sewer-pipe and other tubular clay-products, and the invention consists in certain features of construction and in combinations of parts hereinafter described and pointed out in the claims.

In the accompanying drawings, Figure 1 is a side elevation, partly in section, of a portion of a press, the same comprising the lower portions of the mud-cylinder and attachments. Figs. 2 and 3 are, respectively, an enlarged side elevation, partly in section, and a bottom plan of the knife-head and attachments and adjacent members. Figs. 4 and 5 are, respectively, end and side elevations of the crank. Figs. 6 and 7 are, respectively, plan and side elevations of disk G. Figs. 8 and 9 are, respectively, plan and end elevations of slide I. Figs. 10 and 11 are, respectively, bottom plan and corresponding (that is inverted) plan of cap H. Fig. 12 is a side elevation, partly in section, showing a friction-brake employed, and Figs. 13 and 14 are, respectively, side and end elevations of the driving-medium for the knife-head.

Referring to Fig. 1, A represents the lower portion of the mud-cylinder, the same, a suitable distance from its lower end, having an internal shoulder, $a$, and being provided, at its lower end, with a removable head A'. Said head has a large downwardly and annularly flanged central opening, $A^2$, the flange $a'$ whereof flares upwardly as shown, and serves as the die that gives shape and size to the exterior of the sewer-pipe or other product of the machine.

B represents the core that gives the internal shape and size to the product, said core, at its outer end, having an external diameter sufficiently smaller than the internal diameter of the flange $a'$ to form an annular opening or passage-way $a^2$ through which the clay is forced.

For supporting the core is provided, first, a spider C, that is provided with a rim C' that rests on shoulder $a$ aforesaid. The hub $C^2$ of the spider has a vertical bore, $C^3$, the lower portion of the bore being screw-threaded for engaging the reduced screw-threaded upper end of the core-bar B'. The core is chambered, as at $b$, said chamber being open at its lower end, and the reduced screw-threaded lower end of bar B' extends through a vertical centrally-located hole in the core, and a nut $B^2$ is mounted upon said screw-threaded portion of the core-bar against the top wall of chamber $b$ of the core and secures the core when the latter is in position engaging the shoulder $b'$ formed upon the core-bar by the reduction of the lower end of said bar, the lower end of the core, when in position, being flush with the lower end of the die. By removing nut $B^2$ the core can be removed and another core substituted, as would be the case if a die of different size were to be used.

Bar B' has a central bore extending from end to end thereof to accommodate shaft D, and one of the spider-arms has a horizontal radial bore that accommodates the shaft F. The two shafts D and F are intergeared as shown, the upper portion of hub $C^2$ being counter-bored, or chambered as at $C^4$ to accommodate the gears. A cap $C^5$ is also provided to keep the mud out of chamber $C^4$. Shaft D is provided with a crank-wheel or crank D', the hub $D^2$ whereof has preferably a screw-threaded bore engaged by the correspondingly threaded lower end of the shaft-proper. The crank or crank-disk is shown detached in Figs. 4 and 5, $D^3$ designating the wrist-pin of the same.

G represents a horizontal disk shown detached in Figs. 6 and 7. The back or upper face of the disk is flat, and lower face of the disk is recessed, as at G', to receive with an easy fit the crank or crank-wheel D', (see Figs. 1, 2 and 3) disk G having a central bore $G^2$ to receive the hub of the crank-wheel. When the parts are assembled only wrist $D^3$ extends below rim $G^3$ of disk G; and disk G rests upon, and has no other support than the crank-wheel, and, according to circumstances hereinafter mentioned, disk G may or may not revolve with the crank. Rim G³ of disk G is provided with bolt-holes, g, for receiving bolts or screws g' that secure cap H to the under side of disk G. Disk G and cap H constitute the knife-head. Cap H, that is shown detached in Figs. 10 and 11, has a recess h extending across the inner face thereof, in which recess operates the slide I shown detached in Figs. 8 and 9. Slide I is adapted to reciprocate endwise of recess h. Slide I has a socket I' arranged lengthwise of the slide, and said socket receives the shank J' of knife J, that is shown more clearly in Fig. 1. The outer wall of socket I' is reinforced by a boss I², a screw-threaded hole I³ extending through the boss and socket-wall for receiving the set-screw I⁴ that secures the knife, and cap H has a slot h' for accommodating said boss and set-screw. The slide has a transverse slot i in which operates the crank-wrist D³. Slot i is only long enough to permit the crank to make a half revolution in the one direction or the other without revolving the knife-head. The arrangement of parts is such that a half revolution of the crank in one direction thrusts the knife out to the point shown in Fig. 1, thereby causing the knife to pierce the opposing wall of the sewer-pipe and the knife being retained in such distended position, a revolution of the knife will cause the knife to sever the pipe. Next, if the movement of the crank be reversed, the first half revolution of the crank will move the slide and knife back to the place of beginning, but the knife-head, being, as aforesaid, supported from the crank-disk, would revolve without the crank easier than the slide would move endwise. Hence there must be provided some means of holding the knife-head from revolving until the knife-bearing-slide has been actuated. For this purpose I provide a brake constructed and arranged as follows: K designates a disk (see Figs. 1, 2 and 12) supposed to be of the same diameter as disk G. Disk K is mounted loosely on pins or members k, that depend from the lower end of the stationary core-bar B'. K' represents a disk of leather or other suitable material interposed between disks G and K. Around pins k are coiled springs k' the tension whereof acts downwardly against disk K and causes sufficient friction on disk K' to hold the knife-head from revolving during the first half revolution of the crank. The crank having made a half revolution in either direction, the wrist D³ of the crank will have engaged an end wall of slot i, after which the crank must either stop or cause the knife-head to revolve and as there is nothing to prevent the knife-head from revolving, except the slight friction aforesaid and the resistance of the knife-blade in the clay, the result is, the knife-head revolves with and is driven by the crank so long as the power that drives the knife-head is applied.

From the foregoing, it will be understood that the driving-device for the knife-head should be of such construction that the operator can start, stop and reverse the knife-head instantly at will, and for this purpose I have devised as follows: L (see Figs. 1, 13 and 14) is a stationary-frame having a flange L' adapted to be secured to the side of cylinder A in such position that shaft F hereinbefore referred to may have bearing in two boxes L² rigid or integral with frame L. On shaft F, between boxes L² L², is loosely mounted a sleeve M. Sleeve M has two pairs of arms, m, each arm terminating in a box m'. The two pairs of arms diverge as they extend downwardly as shown in Fig. 14, and the boxes m' of said arms afford bearing, respectively, for shafts N and P. On shaft N is rigidly mounted a friction-wheel N', and shaft P is provided, in like manner, with a friction-wheel, P', these friction-wheels being adapted one at a time to engage in common friction wheel R' fixed to the driving-shaft R that is suitably supported by frame L and bears the driving-pulley R². The swinging-frame comprising sleeve M and its arms m has attached a hand-lever Q, and the gravity of this lever holds the swinging-frame in its central position wherein the opposing friction-wheels do not engage each other.

Shafts N and P bear, respectively, spur-gears N² P² that engage each other, and hence, although wheels N' and P' are rotated in the same direction as they successively engage friction-wheel R', yet these two wheels and their respective shafts always rotate in opposite directions by means of the engaging gears N² P² aforesaid. One shaft, N or P, it matters not which, is intergeared with shaft F, for instance by means of gears f n. Hence, shaft F and the knife-head are rotated in reverse directions by means of reverse movements of the hand-lever. I have shown gear n mounted on shaft N and the relative diameters of the engaging gears n and f are such as to give shaft F a comparatively slow movement, suitable for severing large-pipes. A faster speed of the knife-head is desirable for severing smaller pipe and for this purpose I provide gears n' f' mounted respectively on shafts N and F, gear n' being larger than gear n and gear f' being proportionately smaller than gear f.

What I claim is—

1. In cut-off mechanism of the variety indicated, a crank-wheel or crank, a knife-head mounted loose upon and inclosing the crank, a reciprocating knife-bearing-slide located inside of the knife-head and having a transverse slot engaged by the crank-wrist, an end-wall of the slot engaging the wrist with each half revolution of the crank in either direction, substantially as described.

2. In cut-off mechanism of the variety indicated, the combination with a crank-disk or crank, of a knife-head and reciprocating knife-bearing-slide having a transverse slot engaged by the crank-wrist, and a friction-brake operating on the knife-head, the arrangement of parts being substantially as and for the purpose set forth.

3. In cut-off mechanism of the variety indicated, the combination with a shaft D, suitable means for driving said shaft and means or mechanism for reversing the direction of rotation of the shaft, of a crank-wheel or crank D' operatively connected with the shaft and provided with a wrist $D^3$, a knife-head supported by and inclosing the crank, a reciprocating knife-bearing slide adapted to operate within the head and having a transverse slot engaged by the crank-wrist, the length of said slot and the arrangement of parts being substantially as and for the purpose set forth.

4. In cut-off mechanism of the variety indicated, the combination with the cutter-operating shaft, of mechanism for driving the said shaft and adapted to rotate the same in opposite directions as required, said mechanism comprising a shaft F intergeared with the aforesaid crank-shaft, a driving-shaft bearing a driving-pulley or wheel and bearing also a friction-wheel R', a swinging-frame suitably supported and two shafts N and P supported by said frame, each of said shafts being provided with a friction-wheel adapted to engage the friction-wheel on the driving-shaft, shafts N and P being intergeared with each other and one of said shafts being intergeared with shaft F, and a lever, Q, connected with the aforesaid swinging-frame, the arrangement of parts being substantially as shown, for the purpose specified.

In testimony whereof, I sign this specification, in the presence of two witnesses, this 15th day of September, 1893.

WILLIAM W. WALLACE.

Witnesses:
C. H. DORER,
L. W. PENFIELD.